Patented May 2, 1939

2,156,406

UNITED STATES PATENT OFFICE 2,156,406

METHOD OF TREATING NUTS

Arthur F. Stagmeier, Montclair, N. J., assignor to General Foods Corporation, New York, N. Y., a corporation of Delaware No Drawing. Application July 16, 1936,
Serial No. 91,005

20 Claims. (Cl. 146—219)

This invention relates to the treatment of nuts and applies particularly to the blanching of nuts having closely adhering skins, such as Brazil nuts, filberts, coconuts, and the like.

Proper blanching of nuts of this type has always been a problem and has been the subject of considerable study and investigation in an effort to devise a more satisfactory procedure than the cumbersome and wasteful one of mechanical removal. Various schemes have been suggested, some more effective than others, but only two have ever received serious attention; that is, treatment with superheated steam, and immersion in a hot caustic solution. Neither of these methods, however, is entirely satisfactory. Subjection to superheated steam imparts a peculiar off-flavor to the nuts, and, if made brief enough to prevent their being cooked, seldom removes all of the skin. The hot caustic treatment, on the other hand, is difficult to control within the limits necessary to prevent destruction of the meat as well as the skins, results in excessive moisture penetration into the nuts, and causes the development of an objectionable translucency in the outer layers of the meat.

The principal object of the present invention is to provide a method of treating nuts which will be more satisfactory than either of the prior processes mentioned above and which will accomplish the blanching of Brazil nuts and others of similar type in a novel and economical manner without any impairment of their flavor, texture, or appearance. The method which I have provided in fulfillment of this purpose consists primarily in freeing the nuts of their skins by means of a combined hydrolyzing and oxidizing treatment.

Another object is to provide a new and more effective blanching solution for use in connection with the preparation of nuts for market.

Brazil nuts and the like have a skin composed mainly of fibrous cellulosic material and lignin, the lignin serving more or less as a binder. When the lignin is hydrolized, as by treatment with a solution of sodium hydroxide, its binding qualities are destroyed and the skeletal structure of the skin is loosened; the cellulosic fibers, however, are not materially affected by such a solution. Consequently, when only a hydrolyzing solution is used, a further washing or agitation of the nuts is necessary in order to slough off the skin. Addition of an oxidizing agent to the caustic solution, on the other hand, results in a destruction of the fibers as well as the skin, and by properly proportioning the oxidizing and hydrolyzing effects, the skin not only can be entirely loosened but also can be dissolved without damage to the structure of the meat itself, thereby eliminating the need for the sloughing-off step and the problems attendant upon separation of the loosened skins from the kernels.

Of the various solutions capable of use in the method of the present invention for producing the desired effect, I have found solutions of sodium hydroxide and sodium hypochlorite to be the most effective, and, because of the cheapness of the ingredients, more desirable than any others for commercial purposes. Accordingly, consideration will be directed primarily to such solutions, with the understanding, however, that the attendant description is by way of example only and is not to be construed as definitive of the scope of the invention. For instance, as shown the examples later given, calcium hypochlorite may be used as the oxidizing agent instead of sodium hypochlorite. Preferably, a suitable percentage of sodium carbonate and sodium phosphate is also incorporated in the solution to facilitate the reaction. I have further found that by adding a small amount of a surface tension reducing agent, such as soap, the penetration of the solution into the skins is augmented to such an extent that effective blanching can be obtained without the use of heat in from six to twelve minutes, as compared with two to four minutes for hot soap-free solutions of otherwise the same composition.

This latter aspect of my invention is perhaps of greater significance than any other, and offers advantages not possessed by any of the blanching processes heretofore used. Elimination of heat prevents rupture of the oil cells in and near the surface of the kernels and thereby avoids the translucent appearance so characteristic of hot blanched nuts. It also greatly reduces moisture penetration into the nuts, making them less rubbery, and, in addition to the initial saving in fuel costs, materially decreases the length of the drying period required to bring the kernels back to proper crispness. Furthermore, a cold solution has the advantage of being more readily controllable in its effect on the nuts than one which is heated, and, of particular importance in the case of bland nuts such as Brazil nuts, has little if any effect on the flavor. Whatever time may be lost by reason of the few extra minutes required for the blanching step when a cold solution is used is more than made up in the washing treatment hereinafter described which is far shorter than that required when heat is used.

For examples of solutions which I have found suitable in practice, reference may be had to the following, the amounts in each case being those preferred for a two hundred pound batch of Brazil nuts. For larger or smaller batches the amounts may be varied in proportion.

*Example 1*

| | | |
|---|---|---|
| $H_2O$ | gals | 6 |
| NaOCl solution (13% available chlorine) | gals | 5 |
| NaOH | lbs | 2.8 |
| $Na_3PO_4$ | lbs | .6 |
| $Na_2CO_3$ | lbs | .6 |
| Soap | lbs | .02 |

*Example 2*

| | | |
|---|---|---|
| $H_2O$ | gals | 10 |
| Special $Ca(OCl)_2$ (65% available chlorine) | lbs | 11 |
| $Na_2CO_3$ | lbs | 10 |
| NaOH | lbs | 2.8 |
| $Na_3PO_4$ | lbs | .6 |
| Soap | lbs | .02 |

*Example 3*

| | | |
|---|---|---|
| $H_2O$ | gals | 10 |
| $Ca(OCl)_2$ (35% available chlorine) | lbs | 22 |
| $Na_2CO_3$ | lbs | 20 |
| NaOH | lbs | 2.8 |
| $Na_3PO_4$ | lbs | .6 |
| Soap | bls | .02 |

In carrying out the invention, a convenient sized batch of nuts, as for instance the two hundred pounds of Brazil nuts above referred to, is placed in a drum or other suitable container in which the nuts can be agitated or tumbled, and the appropriate amount of solution is added, the solution preferably being cold or unheated; that is, it may be at room temperature, for example. I have found that a revolving drum such as is customarily used for mixing concrete is particularly well adapted for this agitation. After addition of the solution, which, as will be apparent upon consideration of the foregoing examples, is sufficient in amount to thoroughly moisten the nuts but not so great as to provide much free liquid, the mixer is rotated for from six to twelve minutes, depending on the particular type of nut being blanched. Brazil nuts from different areas vary in the toughness of their skins, and so do filberts and coconuts. When it has been determined by observation that the blanching is complete, water is run into the mixer and rotation continued for several minutes longer, or until the nuts have been washed substantially free of the solution. The nuts may then be removed and dried, if desired, and will constitute a thoroughly acceptable product due primarily to the fact that the use of the solution in cold state results in only a very slight penetration thereof into the meat of the nuts.

If nuts of superior flavor and color are required, however, a small amount of sodium bicarbonate, a pound for example, may be added to the washing water in the mixer and the mass agitated for several minutes more to effect absorption of any remaining traces of the characteristic chlorine-like odor of the hypochloride. To ensure that this treatment does not leave the nuts in an alkaline condition, it usually will be found desirable after the bicarbonate treatment to refill the mixer with water slightly acidulated with hydrochloric or other suitable acid, and to again agitate the nuts for a few minutes. The acid also has a tendency to whiten the nuts, a result which for some purposes is considered an advantage. After the nuts are washed free from acid with water, they are removed and dried in any suitable manner to bring their moisture content to the desired level.

There is thus provided by the present invention a novel, efficient and economical method of blanching nuts which is a marked improvement in both the procedure followed and the results obtained over the methods hitherto practiced by the art. The invention also provides a new and more effective blanching solution for use in the treatment of nuts, one of the most important advantages of which is its capability for use in cold or unheated state.

Although the method of the invention has been described in some detail with reference to the treatment of Brazil nuts, it will be understood that it is also applicable to various other species of nuts with little or no variation in the procedural steps. It is also obvious that the method is not limited to the use of any particular apparatus for carrying out the operations described. Likewise, the invention is not restricted to the use of the specific solutions set forth above as examples since the proportions of the ingredients thereof may be varied within reasonable limits dependent upon the character and quantity of the nuts being treated and the conditions under which the treatment is effected. It is also to be recognized that certain of the ingredients specified in the examples may be either omitted or replaced by their chemical equivalents; for instance, the soap may be replaced by other surface tension reducing agents operative in a hydrolyzing and oxidizing solution or may be entirely omitted. Various other changes and modifications, which will now become apparent to those skilled in the art, may be made in the detailed procedure of the method and in the specific constitution of the blanching solution without departing from the spirit of the invention. Reference is therefore to be had to the appended claims for a definition of the scope of the invention.

What is claimed is:

1. A method of treating nuts having skins comprising lignin and fibrous cellulosic material which includes the steps of subjecting the nuts to the action of a solution containing both hydrolyzing and oxidizing agents for a period of time sufficient to effect both hydrolysis of the lignin and oxidation of the cellulosic material and consequent loosening and dissolution of the skins of the nuts, washing the kernels until they are substantially free of said solution, and then drying the kernels to the desired moisture content.

2. A method of treating nuts having skins comprising lignin and fibrous cellulosic material which includes the steps of agitating the nuts while subjecting them to the action of a solution containing both hydrolyzing and oxidizing agents for a period of time sufficient to effect both hydrolysis of the lignin and oxidation of the cellulosic material and consequent loosening and dissolution of the skins of the nuts, washing the kernels until they are substantially free of said solution, and then drying the kernels to the desired moisture content.

3. A method of treating nuts having skins comprising lignin and fibrous cellulosic material which includes the steps of subjecting the nuts to the action of an unheated solution containing both hydrolyzing and oxidizing agents and a small quantity of a surface tension reducing agent for a period of time sufficient to effect both hydrolysis of the lignin and oxidation of the cellulosic material and consequent loosening and dissolution of the skins of the nuts, washing the kernels until they are substantially free of said solution, and then drying the kernels to the desired moisture content.

4. A method of treating nuts which includes the steps of subjecting the nuts to the action of an aqueous solution containing sodium hydroxide and a hypochlorite of the group comprising sodium and calcium for a period of time sufficient to effect both loosening and dissolution of the skins of the nuts, washing the kernels until they are substantially free of said solution, and then drying the kernels to the desired moisture content.

5. A method of treating nuts which includes the steps of subjecting the nuts to the action of an unheated aqueous solution containing sodium hydroxide, sodium hypochlorite and a small quantity of soap for a period of time sufficient to effect both loosening and dissolution of the skins of the nuts, washing the kernels until they are substantially free of said solution, and then drying the kernels to the desired moisture content.

6. A method of treating nuts which includes the steps of subjecting the nuts to the action of an unheated aqueous solution containing sodium hydroxide, calcium hypochlorite, sodium carbonate and a small quantity of soap for a period of time sufficient to effect both loosening and dissolution of the skins of the nuts, washing the kernels until they are substantially free of said solution, and then drying the kernels to the desired moisture content.

7. A method of treating nuts which includes the steps of subjecting the nuts to the action of an aqueous solution containing sodium hydroxide and a hypochlorite of the group comprising sodium and calcium for a period of time sufficient to effect both loosening and dissolution of the skins of the nuts, washing the kernels until they are substantially free of said solution, adding a small amount of sodium bicarbonate to the washing water and continuing the washing until all of the free chlorine is absorbed, then washing the kernels with slightly acidulated water and fresh water in succession, and finally drying the kernels to the desired moisture content.

8. In a method of blanching nuts having skins comprising lignin and fibrous cellulosic material, the steps of moistening the nuts with a solution containing both hydrolyzing and oxidizing agents, and then agitating the moistened nuts until the skins thereof become both loosened and dissolved in said solution as a result of hydrolysis and oxidation of the lignin and cellulosic material.

9. In a method of blanching nuts having skins comprising lignin and fibrous cellulosic material, the steps of moistening the nuts with a cold solution containing both hydrolyzing and oxidizing agents, and then agitating the moistened nuts for from six to twelve minutes until the skins thereof become both loosened and dissolved in said solution as a result of hydrolysis and oxidation of the lignin and cellulosic material.

10. In a method of blanching nuts, the steps of moistening the nuts with a cold solution containing sodium hydroxide, a hypochlorite of sodium, calcium or the like and a small quantity of soap, and then agitating the moistened nuts for from six to twelve minutes.

11. In a method of blanching nuts, the steps of moistening the nuts with a cold aqueous solution containing sodium hydroxide, a hypochlorite of sodium, calcium or the like, sodium carbonate, sodium phosphate and a small quantity of soap, and then agitating the moistened nuts for from six to twelve minutes.

12. In a method of blanching nuts of the type having skins composed of lignin and fibrous cellulosic material, the step of subjecting the nuts to the action of a solution containing both hydrolyzing and oxidizing agents for a period of time sufficient to effect both hydrolysis of the lignin and oxidation of the cellulosic material and consequent loosening and dissolution of the skins of the nuts but insufficient to permit any substantial penetration of the solution into the meat of the nuts.

13. In a method of blanching nuts of the type having skins composed of lignin and fibrous cellulosic material, the step of agitating the nuts for from six to twelve minutes while subjecting them to the action of an unheated solution containing agents for both hydrolyzing the lignin and oxidizing the cellulosic material and a small quantity of a surface tension reducing agent.

14. In a method of blanching nuts of the type having skins composed of lignin and fibrous cellulosic material, the step of agitating the nuts for from six to twelve minutes while subjecting them to the action of a cold aqueous solution containing sodium hydroxide, a hypochlorite of sodium, calcium or the like and a small quantity of soap.

15. In a method of blanching nuts of the type having skins composed of lignin and fibrous cellulosic material, the step of agitating the nuts for from six to twelve minutes while subjecting them to the action of a cold aqueous solution containing sodium hydroxide, calcium hypochlorite, sodium carbonate and a small quantity of soap.

16. A blanching solution for use in the treatment of nuts having skins comprising lignin and fibrous cellulosic material containing agents for both oxidizing the cellulosic material and hydrolyzing the lignin and a small quantity of a surface tension reducing agent.

17. A blanching solution for use in the treatment of nuts containing sodium hydroxide and a hypochlorite of the group comprising sodium and calcium.

18. A blanching solution for use in the treatment of nuts containing sodium hydroxide, sodium hypochlorite, and a small quantity of soap.

19. A blanching solution for use in the treatment of nuts containing sodium hydroxide, calcium hydroxide, sodium carbonate, and a small quantity of soap.

20. A blanching solution for use in the treatment of nuts containing sodium hydroxide, a hypochlorite of the group comprising sodium and calcium, sodium carbonate, sodium phosphate, and a small quantity of soap.

ARTHUR F. STAGMEIER.